United States Patent [19]

Smith et al.

[11] Patent Number: 4,613,099
[45] Date of Patent: Sep. 23, 1986

[54] LATCH SIGNAL AND COWLING STRUCTURE

[75] Inventors: Keith O. Smith; Jerry L. Glancy, both of Wichita, Kans.

[73] Assignee: The Boeing Company, Seattle, Wash.

[21] Appl. No.: 650,260

[22] Filed: Sep. 13, 1984

Related U.S. Application Data

[63] Continuation-in-part of Ser. No. 346,375, Feb. 5, 1982, abandoned.

[51] Int. Cl.⁴ .................. B64C 1/14; E05C 19/12
[52] U.S. Cl. .................. 244/53 R; 244/129.4; 292/106; 292/113; 292/DIG. 65
[58] Field of Search .................. 292/336.3, DIG. 31, 292/DIG. 65, 207, 150, 106, 113, 175, 163, 42; 70/432; 244/129.4, 53 R; 60/39.31

[56] References Cited

U.S. PATENT DOCUMENTS

| | | | |
|---|---|---|---|
| 2,742,105 | 4/1956 | Dow | 292/DIG. 65 X |
| 3,250,412 | 7/1966 | Wheeler | 292/DIG. 31 X |
| 3,259,558 | 5/1966 | McClintock | 292/207 X |
| 3,602,536 | 8/1971 | Gamble | 292/DIG. 65 X |
| 3,697,106 | 10/1972 | Meyer | 292/175 |
| 3,978,618 | 9/1976 | Malo | 292/207 X |
| 4,086,670 | 5/1978 | Krause et al. | 292/DIG. 65 X |
| 4,286,810 | 9/1981 | Ehmen | 292/175 X |
| 4,365,775 | 12/1982 | Glancy | 292/113 X |

Primary Examiner—Kenneth J. Dorner
Assistant Examiner—Russell W. Illich
Attorney, Agent, or Firm—Edwin H. Crabtree

[57] ABSTRACT

A latch signal for mounting inside an engine cowling structure. The signal indicating when an internal latch is inadvertently left unlatched when the cowlings are closed. Further, the signal prevents adjacent cowlings from closing until the internal latch is properly secured.

8 Claims, 9 Drawing Figures

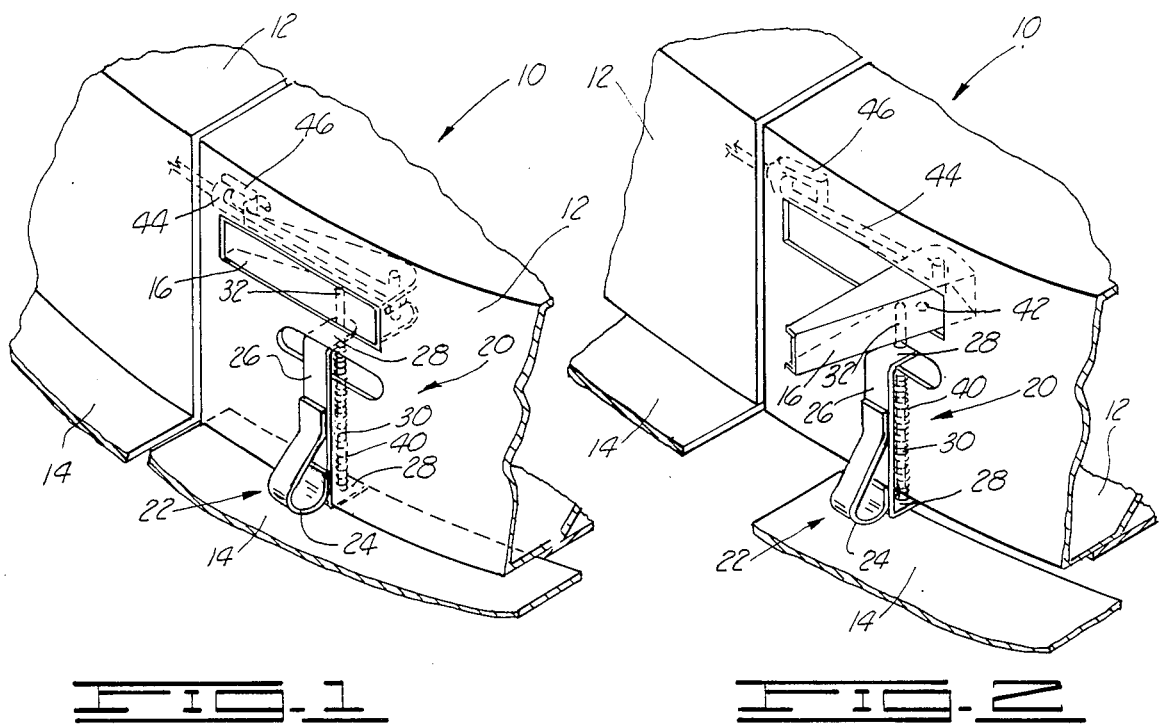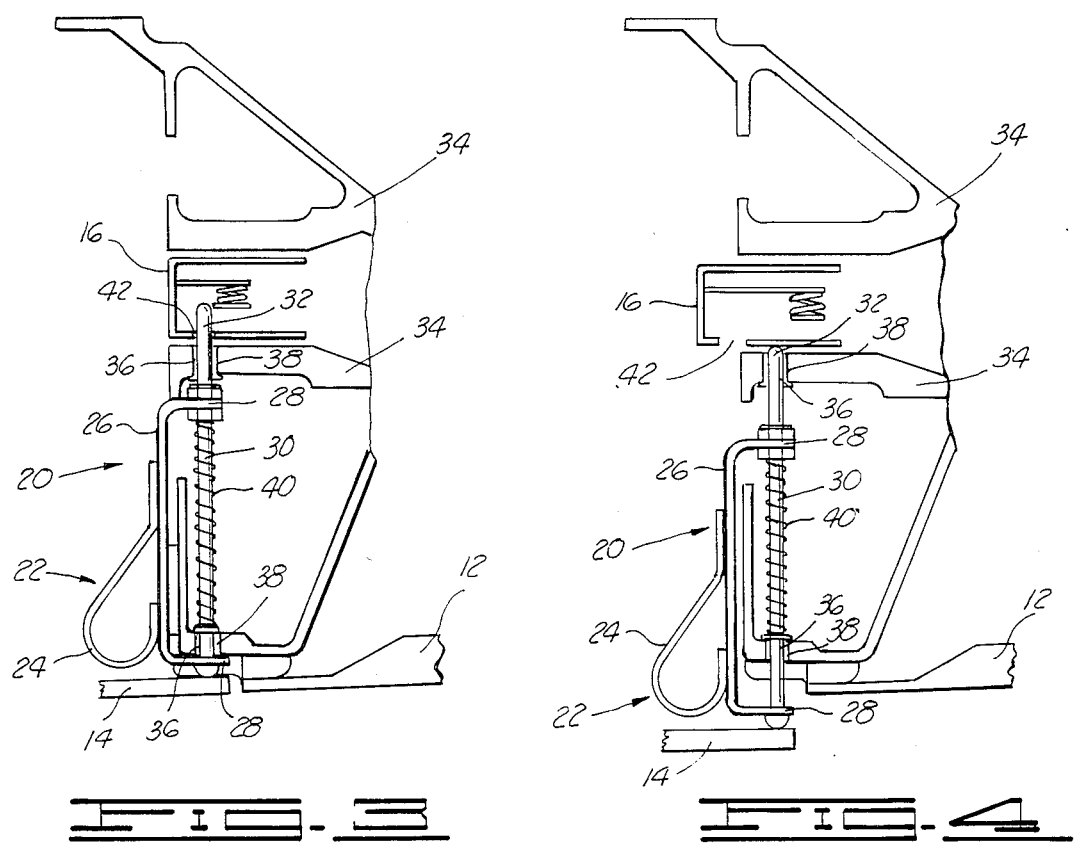

LATCH SIGNAL AND COWLING STRUCTURE

BACKGROUND OF THE INVENTION

This is a continuation-in-part application based on our application filed Feb. 5, 1982, Ser. No. 346,375, abandoned, and entitled Latch Signal for an Engine Cowling.

The invention relates to a signal and more particularly but not by way of limitation to a latch signal used inside an engine cowling surrounding a jet engine or the like. The signal used to indicate when an internal latch is inadvertently left in an opened position. Also, the signal prevents adjacent cowling from closing until the internal latch is properly secured.

Heretofore, there have been various types of latches used with engine cowlings. The standard latch uses a handle with a latch hook which engages a latch keeper attached to an adjacent cowling. In U.S. Pat. No. 2,322,948 to Lofgren, U.S. Pat. No. 2,742,105 to Dow, U.S. Pat. No. 2,860,724 to Beede et al and U.S. Pat. No. 2,860,725 to Cawl et al various types of latches used with vacuum cleaning devices are disclosed. Also the following U.S. patents were cited during the prosecution of our original application. They are U.S. Pat. No. 3,250,558 to McClintock, U.S. Pat. No. 3,259,412 to Wheeler, U.S. Pat. No. 3,602,536 to Gamble, U.S. Pat. No. 3,697,106 to Meyer, U.S. Pat. No. 3,978,618 to Malo, U.S. Pat. No. 4,086,670 to Krause et al, U.S. Pat. No. 4,365,775 to Glancy. None of these prior art latches or the standard latches used in the aircraft industry provide the unique features and advantages of the subject latch signal as described herein.

SUMMARY OF THE INVENTION

The subject latch signal for an engine cowling indicates to personnel performing maintenance on a jet engine that an engine cowling has not been latched securely and an internal latch has inadvertently been left in an opened position. Further, the latch signal prevents adjacent cowlings from being closed until the internal latch is properly secured.

Also, the latch signal while being a signal to maintenance personnel further provides the additional safety feature of securing the internal latch in a closed position.

The latch signal for an engine cowling is simple in design, rugged in construction and can be adapted for various types of engine nacelles and cowlings used with jet engines, piston driven engines and the like.

The latch signal for mounting inside an engine cowling and engaging an internal latch when the latch is closed includes a handle assembly slidably mounted on the cowling structure. The handle assembly includes a handle attached to a "U" shaped handle frame. The frame has outwardly extending arms with apertures therein for receiving a plunger. One end portion of the plunger extends upwardly from the "U" shaped frame for receipt in an aperture in the internal latch when the latch is in a closed position. The end portion of the plunger rests against the side of the latch when the latch is in an opened position. Further, the handle assembly extends outwardly from the cowling structure when the end portion of the plunger rests against the latch thereby preventing an adjacent cowling from closing next to the cowling structure. A coil spring is attached to the handle assembly and is disposed around the plunger for biasing the end portion of the plunger against the side of the latch and urging the end portion into the aperture is the latch when the latch is in a closed position.

The advantages and objects of the invention will become evident from the following detailed description of the drawings when read in connection with the accompanying drawings which illustrate preferred embodiments of the invention.

BRIEF DESCRIPTION OF THE DRAWINGS

FIGS. 1 and 3 illustrate a portion of an internal cowling and an external cowling with an internal latch in a closed position.

FIGS. 2 and 4 illustrate a portion of the internal and external cowlings with the internal latch in an opened position.

DETAILED DESCRIPTION OF THE DRAWINGS

Figures 5, 6:
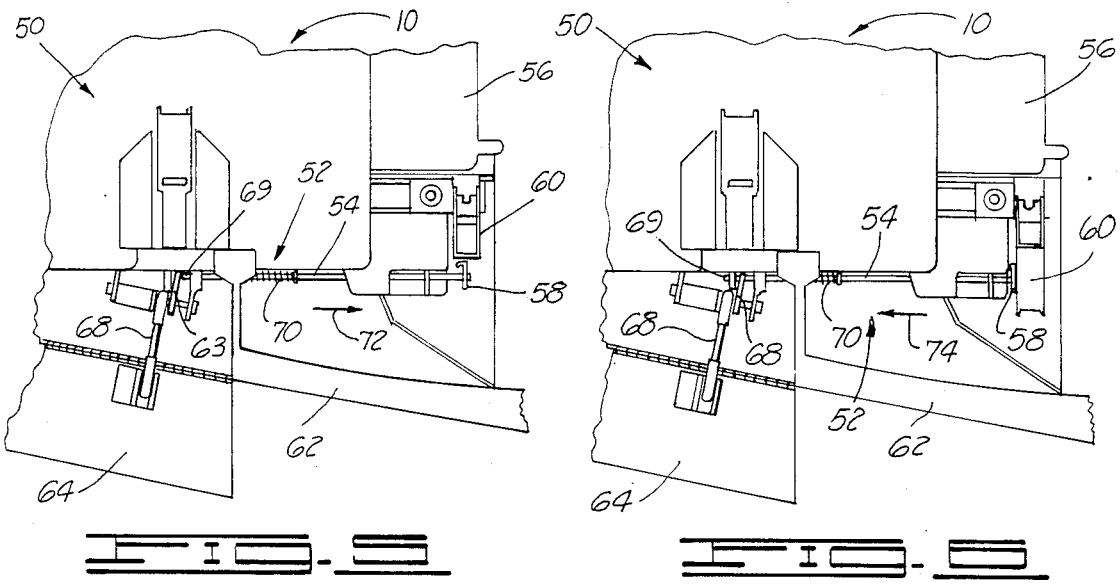
FIGS. 5 and 7 illustrate an alternate embodiment of the latch signal and cowling structure with an internal latch in a closed position.
FIGS. 6 and 8 illustrate the internal latch in an open position.

In the drawings a portion of a standard jet engine nacelle is illustrated and designated by general reference numeral 10. The nacelle 10 is attached to an aircraft wing by a strut. The nacelle 10 typically includes an inlet cowl, a fan cowl, a thrust reverser cowl, a core cowl and an exhaust structure with exhaust plug. Normally on these types of engines nacelles, the fan cowling, the thrust reverser cowling and core cowling are split in half and secured by internal and external latches so the engine nacelle can be opened to perform maintenance on the jet engine inside.

For the purpose of this discussion, the subject invention will be described when used to secure an internal latch inside a thrust reverser cowling or internal cowling 12 with an external fan cowling or external cowling 14 having to be open by external latches prior to the opening of the internal latches attached to the split internal cowling 12. It can be appreciated that the subject invention can be used equally well with internal latches and external latches on various types of engine cowlings which are split and swing into an opened position to provide maintenance on the engine therein.

Quite often because maintenance personnel are not thorough in their work, an internal latch such as latch 16 is inadvertently left in an opened position. Also, heretofore, if the internal latch was left open, there was nothing to stop the personnel from closing the adjacent external cowling 14 which is externally latched and no one would be aware that the internal latch 16 was open until the external cowling was again opened.

In FIGS. 1 and 3 the latch signal is designated by general reference numeral 20 and shown in a closed position. The signal 20 includes a handle assembly 22 having a handle 24 attached to a "U" shaped handle frame 26 with outwardly extending arms 28. The arms 28 include apertures therein for receiving a plunger 30 having an end portion extending outwardly from the upper arm 28 of the frame 26. The handle assembly 22 is slidably attached to a cowling structure 34 by inserting the plunger 30 through a pair of apertures 36 in the cowling structure 34 and having bushings 38 mounted in the apertures.

A coil spring 40 is attached to the handle assembly 22 and received around the plunger 30 and held in compression between the upper arm 28 and the lower bushing 38. The spring 40 biases the handle assembly 22 upwardly for urging the end portion 32 of the plunger 30 into an aperture 42 in the latch handle 36. In FIG. 1 and FIG. 3 the end portion 32 can be seen extending through the aperture 42 with the latch 16 in a closed position.

Referring now to FIG. 1, the latch 16 has a standard latch hook 44 which engages a latch keeper 46 which is mounted to the cowling structure 34 of the internal cowling 12. When the internal latch 16 is properly closed, the exterior cowling 14 is swung into a closed position adjacent the interior cowling 12 and secured together by an external latch. It should be noted with the end portion 32 received in the internal latch 16, the latch 16 is provided with the additional safety feature in that it cannot be opened until the handle 24 of the handle assembly 22 is gripped and the latch signal 20 is urged downwardly thereby removing the end portion 32 of the plunger 30 from the aperture 42 in the latch 16 thereby allowing the internal latch 16 to be opened.

Referring now to FIGS. 2 and 4, the latch 16 can be seen left in an opened position with the end portion 32 of the plunger 30 resting against the side of the latch 16.

In this position, the lower portion of the latch signal 20 extends downwardly from the side of the internal cowling 12 thereby preventing the adjacent external cowling 14 from swinging into its completely closed position. By obstructing the closing of the external cowling 14 the maintenance personnel are quickly alerted that the internal latch 16 has inadvertently been left in an opened position.

It can be appreciated, if the latch 16 is in a completely closed position receiving the end portion 32 of the plunger 30 therein but the latch hook 44 has failed to engage the latch keeper 46, the end of the latch hook 44 will bear against the end of the keeper 46 preventing the two split internal structures of the internal cowling 12 from completely closing. The maintenance personnel should then be alert that the standard latch hook 44 and latch keeper 46 are not engaged and the latch 16 needs to be open to complete the proper engagement.

When the standard internal latch 16 is properly closed and the aperture 42 moves into position inside the internal cowling structure 34, the spring 40 biases the handle assembly 22 along with the end portion 32 of the plunger 30 upwardly with the end portion 32 urged into the aperture 42 of the latch 16 thereby placing the latch signal 20 in its proper closed position until it is again desired to open the internal latch 16 and perform maintenance inside the cowling 12. As mentioned above, the unique latch signal 20 was discussed in conjunction with an internal latch 16 used for securing the split halves of the internal cowling 12. Again, latch signal 20 can be used in various applications and in conjunction with different types of cowlings in engine nacelle construction to alert maintenance personnel that a latch has not been properly closed.

Figures 7, 8:
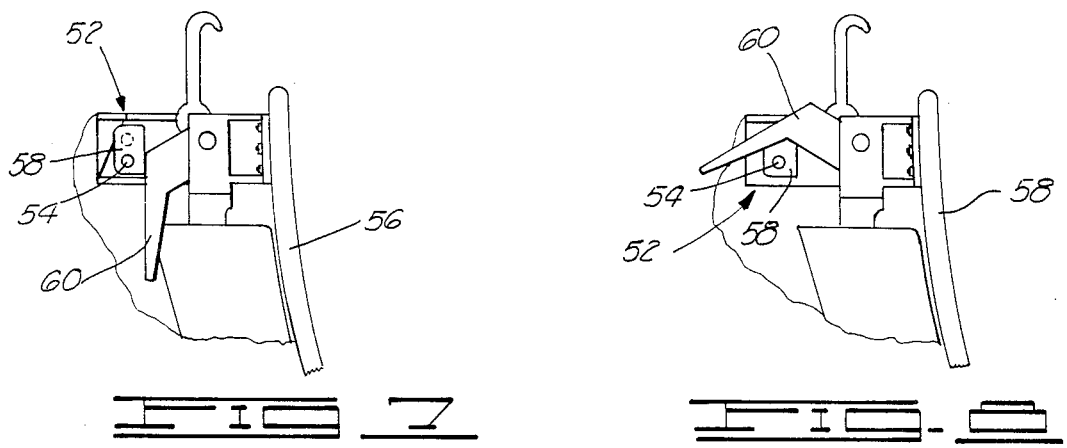

In FIGS. 5 through 9 an alternate embodiment of a latch signal and cowling structure is shown and designated by general refrence numeral 50. The latch signal and cowling structure 50 includes a latch signal assembly 52 having an elongated plunger 54 slidably mounted in an internal cowling 56 and attached to a bearing plate 58. The bearing plate 58 is disposed adjacent an internal latch 60 which is used for securing together the split halves of the internal cowling 56. Disposed around the internal cowling 56 is a split external cowling 62 having an access door 64 having a hinge assembly 66 with hinge arm 68. The hinge arm 68 is disposed adjacent an end portion 69 of the plunger 54 when the latch signal assembly 52 is in its proper position and the internal latch 60 is closed as shown in FIGS. 5 and 7.

When the internal latch 60 is properly closed securing the split halves of the internal cowling 56, a coil spring 70 disposed around the plunger 54 biases the bearing plate 58 outwardly with the bearing plate disposed on top of the internal latch 60. At this time, the end portion 69 of the plunger 54 is moved to the right as indicated by arrow 72 thereby allowing the hinge arm 68 and hinge assembly 66 to move freely thereby allowing an access door 64 of the external cowling 62 to be closed.

Should the internal latch 60 be inadvertently left open as shown in FIGS. 6 and 8, the bearing plate 58 rests against the side of the latch 60 with the plunger 54 biased to the left as indicated by arrow 74 compressing the spring 70 and moving the end portion 69 of the plunger 54 to the left blocking the closing of the hinge assembly 66. When this occurs and the maintenance personnel tries to close the access door 64 the door is prevented from closing because the hinge arm 68 engages the side of the end portion 69 of the plunger 54. When this occurs the maintenance personnel realizes that the internal latch 60 has not been properly closed. At this time, the internal latch 60 is then closed and the coil spring 70 biases the bearing plate 58 to the right with the end portion 69 of the plunger 54 moved also to the right allowing the hinge assembly 68 to be properly closed along with the access door 64.

Figure 9:
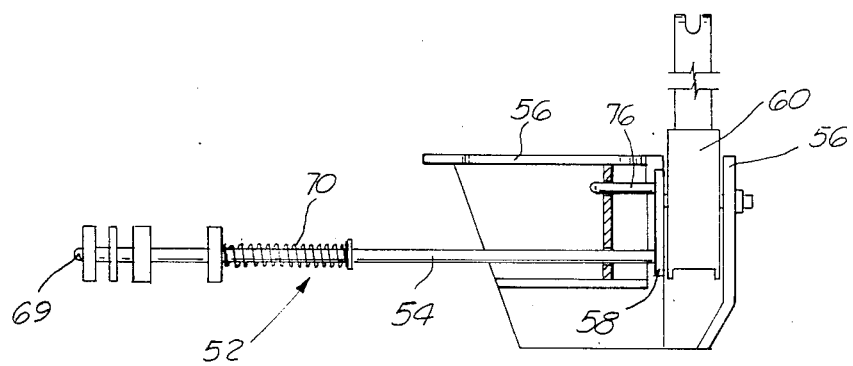
FIG. 9 illustrates a bottom view of the alternate embodiment of the latch signal with the internal latch in an opened position.

In FIG. 9 a bottom view of the latch signal assembly 52 can be seen. In this view, the assembly 52 can be seen having a guide pin 76 received in a portion of the internal cowling structure 56 for properly guiding the bearing plate 58 and plunger 54 as it moves back and forth on the cowling structure 56 when the internal latch 60 is opened and closed for providing maintenance on the engine inside the split cowling halves of the internal cowling 56.

It should also be noted that the latch signal and cowling structure 50 provide an additional benefit in that the bearing plate 58 rests on top of the internal latch 60 when it is properly closed thereby aiding in the prevention of the latch 60 from becoming opened and not until the bearing plate 58 and plunger 54 are moved to the left can the internal batch 60 be released for opening the split halves of the internal cowling 56.

Changes may be made in the construction and arrangement of the parts or elements of the embodiments as described herein without departing from the spirit or scope of the invention defined in the following claims.

What is claimed is:

1. A latch signal and cowling structure, the structure surrounding a jet engine and the like, the signal and structure comprising:

a split internal cowling surrounding the engine;

a split external cowling surrounding the internal cowling;

an internal latch mounted on one of the split internal cowlings for securing together the internal cowling, the latch having an aperture therein;

a handle assembly slidably mounted on the internal cowling; and a plunger attached to the handle assembly, the plunger having an end portion adapted for receipt in the aperture of the internal latch when the internal latch is in a closed position, the end of the plunger resting against a side of the latch when the latch is in an opened position, the handle assembly extending outwardly from the internal cowling when the end portion of the plunger rests against the latch thereby preventing the surrounding external cowling from closing and signalling that the split internal cowling needs to be properly closed and latched.

2. The latch signal and cowling structure as described in claim 1 further including a coil spring attached to the handle assembly and disposed around the plunger, the coil spring held in compression and biasing the plunger and handle assembly towards the side of the latch for urging the end portion of the plunger into the aperture in the internal latch when the internal latch is in a closed position.

3. The latch signal and cowling structure as described in claim 1 wherein the handle assembly includes a handle attached to a "U" shaped handle frame, the frame having outwardly extending arms with apertures therein for receiving the plunger therethrough, the end portion of the plunger extending outwardly from one of the arms for engaging the internal latch.

4. A latch signal and cowling structure, the structure surrounding a jet engine or the like, the signal and structure comprising:
   a split internal cowling surrounding the engine;
   a split external cowling surrounding the internal cowling;
   an internal latch mounted on one of the split internal cowlings for securing together the internal cowling, the latch assembly having an aperture therein;
   a handle assembly having a handle attached to a "U" shaped handle frame, the frame having outwardly extending arms with apertures therein, the handle assembly slidably mounted on the internal cowling;
   a plunger received through the apertures in the arms of the handle frame with an end portion of the plunger extending outwardly therefrom, the end portion of the plunger adapted for receipt in the aperture of the internal latch when the internal latch is in a closed position, the end portion of the plunger resting against a side of the latch when the latch is in an opened position, the handle assembly extending outwardly from the internal cowling when the end portion of the plunger rests against the latch thereby preventing the surrounding external cowling from closing and signalling that the split internal cowling needs to be properly closed and latched; and
   a coil spring attached to the handle assembly and disposed around the plunger, the coil spring held in compression between one arm of the handle frame and the internal cowling and biasing the end portion of the plunger against the side of the latch and urging the end portion into the aperture in the latch when the latch is in a closed position.

5. A latch signal and cowling structure, the structure surrounding a jet engine and the like, the signal and structure comprising:
   a split internal cowling surrounding the engine;
   a split external cowling surrounding the internal cowling, the external cowling having an access door therein;
   an internal latch mounted on one of the split internal cowlings for securing together the internal cowlings;
   a bearing plate with a plunger slidably mounted in the internal cowling, the bearing plate biased against a side of the internal latch when the latch is in an opened position, the end of the plunger when the latch is opened, blocking the closing of the access door and signalling that the split internal cowling needs to be properly closed and latched, the bearing plate biased outwardly and disposed on a surface of the latch extending transverse to the side of the latch when the latch is in a closed position with the end of the plunger moved away from blocking the closing of the access door.

6. The latch signal and cowling structure as described in claim 5 further including a guide pin attached to the bearing plate and extending outwardly therefrom, the guide pin received in an aperture in the internal cowling structure, the guide pin providing proper alignment of the bearing plate and plunger as it slides in the internal cowling.

7. The latch signal and cowling structure as described in claim 5 further including a coil spring disposed around the plunger, the coil spring held in compression and biasing the plunger and bearing plate towards the internal latch for urging the bearing plate against the side of the internal latch when the latch is in an open position and urging the bearing plate on top of the internal latch when the internal latch is properly closed.

8. A latch signal and cowling structure, the structure surrounding a jet engine and the like, the signal and structure comprising:
   a split internal cowling surrounding the engine;
   a split external cowling surrounding the internal cowling, the external cowling having an access door therein;
   an internal latch mounted on one of the split internal cowlings for securing together the internal cowlings;
   a bearing plate with plunger and guide pin extending therefrom, the plunger and guide pin slidably mounted in the internal cowling, the end of the plunger when the latch is open blocking the closing of the access door and signalling that the split internal cowling needs to be properly closed and latched, the plunger having a coil spring disposed therearound for biasing the bearing plate against a side of the latch when the latch is in a opened position and biasing the bearing plate on a surface of the latch extending transverse to the side of the latch when the latch is in a closed position.

* * * * *